(No Model.)
G. H. & T. J. STILLE.
ARTICLE OF CONFECTIONERY.
No. 544,394. Patented Aug. 13, 1895.
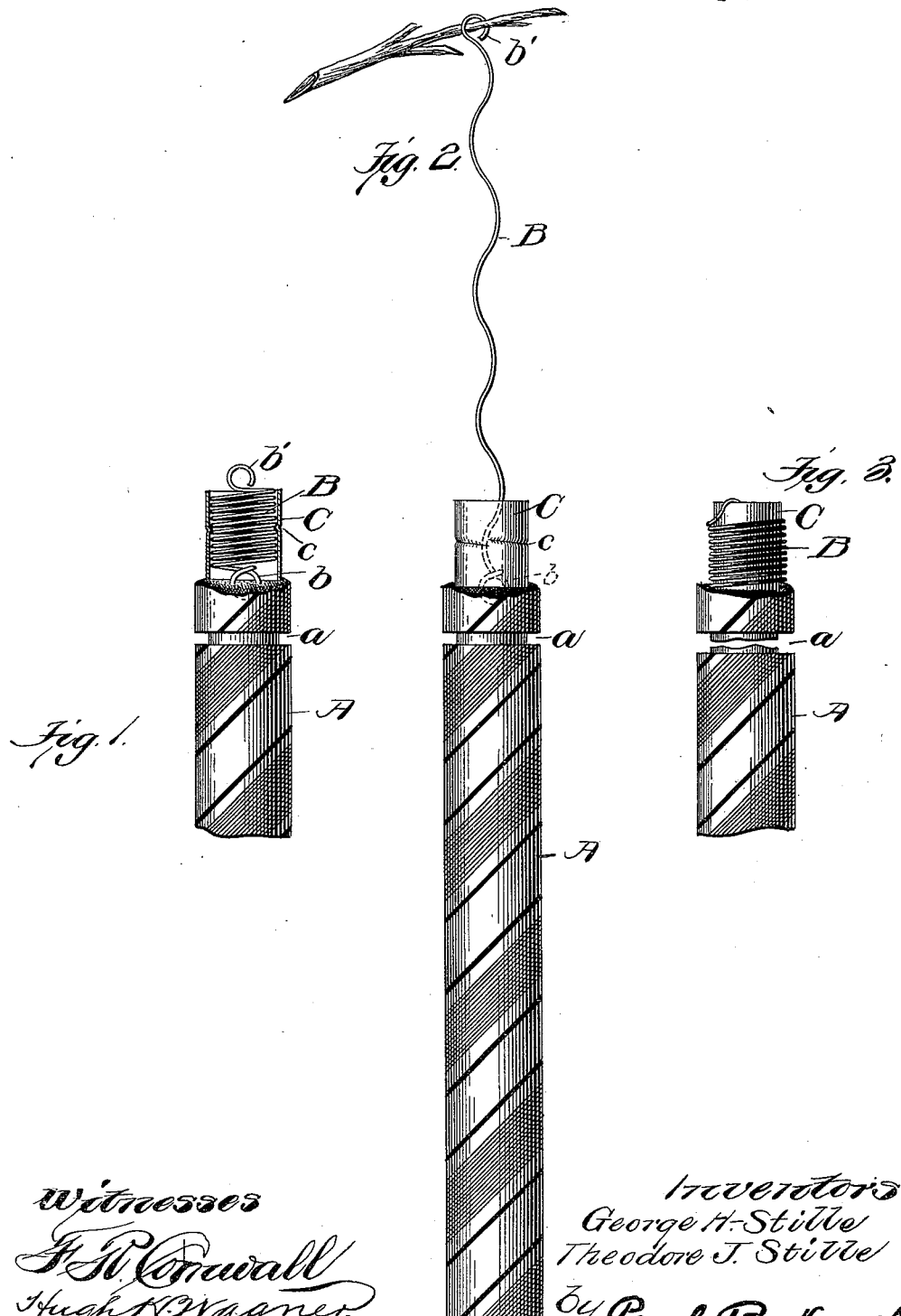
Witnesses
F. R. Cornwall
Hugh H. Wagner
Inventors
George H. Stille
Theodore J. Stille
by Paul Bakewell,
their atty.

UNITED STATES PATENT OFFICE.

GEORGE H. STILLE AND THEODORE J. STILLE, OF ST. LOUIS, MISSOURI.

ARTICLE OF CONFECTIONERY.

SPECIFICATION forming part of Letters Patent No. 544,394, dated August 13, 1895.

Application filed January 14, 1895. Serial No. 534,827. (No model.)

*To all whom it may concern:*

Be it known that we, GEORGE H. STILLE and THEODORE J. STILLE, citizens of the United States, residing in the city of St. Louis, State of Missouri, have invented a new and useful Improvement in Means for Suspending Candies and Like Articles from Trees, of which the following is a full, clear, and exact description, reference being had to the accompanying drawings, wherein—

Figure 1 is a view illustrating our improved means as applied to a stick of candy. Fig. 2 is a similar view illustrating the manner of suspending a stick of candy from a twig or branch of a tree. Fig. 3 is a view illustrating the manner of assembling the parts when the candy is removed from the tree.

This invention relates to a new and useful improvement in means for attaching candies and other like articles to Christmas trees or other desirable supports. Heretofore candies and other articles to be attached to a tree have either been provided with hooks or strings, by which the attachment was made. This invention contemplates the use of an extensible wire which is formed with a loop at one end, which loop is embedded in the candy or otherwise attached to the article to be suspended, while the other end of the wire is attached to its support.

In the drawings we have illustrated a stick of candy A as the article to which our invention is attached. B indicates an extensible wire which is formed by convolutions, the ends of said extensible wire being provided with loops or eyes $b$ and $b'$. In operation the loop $b$ is adapted to be heated slightly and in this condition applied to the candy, which it readily penetrates, and upon cooling forms a permanent connection between the candy and the extensible wire.

To prevent the extensible wire from uncoiling and tangling, and also to preserve its shape, we provide a sleeve or hood C, which fits closely therearound. This hood or sleeve C is slipped loosely over the coil and held in place by indentations $c$. The hood is not directly connected to the candy. In order to prevent the displacement of this hood we prefer to indent the same, as at $c$, preferably in the form of a screw-thread, which thread fits between the convolutions of the extensible wire and enables the hood to be screwed in position. The parts being assembled, as shown in Fig. 1, to attach the article to a tree or other point of support, the eye $b'$ is grasped and the wire B extended, as shown in Fig. 2. The eye $b'$ can be used as a means of attachment, as shown in the drawings, or the wire B may be bent upon itself and around the point of support. When the article is removed the wire B can be coiled around the hood C to prevent its stringing out, as shown in Fig. 3. To readily detach that portion of a stick of candy, such as shown in the drawings, to which our invention was applied, we groove said candy, as at $a$, which reduction permits easy breakage.

Although we have shown our invention as applied to stick-candy, it is obvious that it could as readily be applied to other articles made of candy, such as animals, birds, and the like. It will also be seen that the wire B, with its hooks $b$ and $b'$, could be used to advantage in attaching other articles to trees, such as tinsel-balls and the like.

Having thus described our invention, what we claim, and desire to secure by Letters Patent, is—

1. The combination with an extensible wire having eyes or hooks formed at its ends, one end of which is embedded in or otherwise secured to an article to be suspended, and a hood C for incasing said extensible wire, said hood being formed with indentations to hold it in position, substantially as described.

2. The combination with wire B wound in convolutions, one end of which is attached to an article to be suspended, a hood C, and indentations $c$ on said hood, which indentations engage the convolutions of the wire B, substantially as described.

3. The combination with a stick of candy formed with a reduced portion near one end, of a coiled wire B having one end embedded in the end of the stick of candy nearest the reduced portion, and a hood C having indentations $c$ which engage the convolutions of the wire B, permitting said hood to be screwed in position and retained on the coil, substantially as described.

In testimony whereof we affix our signatures, in presence of two witnesses, this 10th day of January, 1895.

GEORGE H. STILLE.
THEODORE J. STILLE.

Witnesses:
OSCAR Q. STILLE,
ADOLPH H. STILLE.